(12) United States Patent
Shibasaki et al.

(10) Patent No.: US 8,008,222 B2
(45) Date of Patent: Aug. 30, 2011

(54) DIELECTRIC CERAMIC COMPOSITION AND ELECTRONIC DEVICE

(75) Inventors: Tomoya Shibasaki, Tokyo (JP); Takashi Kojima, Tokyo (JP)

(73) Assignee: TDK Corporation, Tokyo (JP)

( * ) Notice: Subject to any disclaimer, the term of this patent is extended or adjusted under 35 U.S.C. 154(b) by 136 days.

(21) Appl. No.: 12/458,463

(22) Filed: Jul. 13, 2009

(65) Prior Publication Data
US 2010/0029464 A1 Feb. 4, 2010

(30) Foreign Application Priority Data
Jul. 31, 2008 (JP) .................................. 2008-197956

(51) Int. Cl.
*C04B 35/468* (2006.01)
*C04B 35/47* (2006.01)
(52) U.S. Cl. ....................... 501/139; 501/138; 361/321.4
(58) Field of Classification Search .................. 501/139, 501/138; 361/321.4
See application file for complete search history.

(56) References Cited

U.S. PATENT DOCUMENTS
7,273,825 B2 * 9/2007 Muto et al. .................... 501/138

FOREIGN PATENT DOCUMENTS
JP U-5-61998 8/1993
* cited by examiner

*Primary Examiner* — Karl E Group
(74) *Attorney, Agent, or Firm* — Oliff & Berridge, PLC (57) ABSTRACT

The present invention relates to a dielectric ceramic composition comprising
a main component expressed by a general formula:

$(Ba_{1-x-y}Sr_xCa_y)_m(Ti_{1-z}Zr_z)O_3$, a first subcomponent comprising Mg oxide,
a second subcomponent comprising at least one kind of oxide selected from oxides of Mn and Cr,
a third subcomponent comprising R oxide (note R is selected at least one kind from Y, La Ce, Pr, Nd, Sm, Gd, Tb, Dy, Ho and Yb), and
a fourth subcomponent comprising an oxide including Si.

8 Claims, 4 Drawing Sheets

---- : A line having slope "a" of -5000 ppm/° C which indicates capacity temperature characteristic.

◊ : A parallelogram surrounded by two parallel lines representing capacitance change rate of -15% and +5 %, with respect to a line having a slope of -5000 ppm/° C, and the other two parallel lines representing -25° C and 105° C, respectively.

Fig. 2B

---- : A line having slope "a" of -3000 ppm/° C which indicates capacity temperature characteristic.

◊ : A parallelogram surrounded by two parallel lines representing capacitance change rate of -15% and +5 %, with respect to a line having a slope of -3000 ppm/° C, and the other two parallel lines representing -25° C and 105° C, respectively.

Fig. 3

◆ : Plot of sample 1 indicating capacitance change rate with respect to temperature (indicating capacity temperature characteristic)

--- : A line having slope "a" of -5000 ppm/° C, which indicates capacity temperature characteristic ◊ : A parallelogram surrounded by two parallel lines representing capacitance change rate of -15% and +5 %, with respect to a line having a slope of -5000 ppm/° C, and the other two parallel lines representing -25° C and 105° C, respectively.

DIELECTRIC CERAMIC COMPOSITION AND ELECTRONIC DEVICE

BACKGROUND OF THE INVENTION

1. Field of the Invention

The present invention relates to a dielectric ceramic composition, showing large absolute value of capacity temperature characteristic within a wide temperature range, and an electronic device, having a dielectric layer constituted by said dielectric ceramic composition.

2. Description of the Related Art

VR (Voltage Regulator) is a system regulating voltage of DC/DC converter, which drives CPU of notebook computer or so. Inductor resistance (Rdc) detects output voltage of VR, however, there was a problem that an error arises in the detected value since Rdc varies due to heat. Therefore, it is required to use properly within a wide temperature range. In the present state, NTC thermistor is used to revise the error of the detected value.

Further, capacitor is normally used for circuit of VR system. It is thought that, by using a capacitor showing large absolute value of capacity temperature characteristic, such as around −5000 ppm, said error can be revised. NTC thermistor is not required with this method, and its cost is reduced with advantage.

On the other hand, there is a demand for a capacitor showing small absolute value of capacity temperature characteristic, therefore, a capacitor showing large absolute value of capacity temperature characteristic is scarcely informed. Note that the absolute value of capacity temperature characteristic of normal capacitor is at most around −1000 ppm/° C. or 350 ppm/° C.

Japanese Utility Model Publication No. H5-61998 describes a ceramic capacitor using ceramic as dielectric wherein said ceramic shows capacity temperature characteristic of −1500 ppm/° C. to −5000 ppm/° C. and includes 20 to 95 wt % of $SrTiO_3$. However, dielectric layer composition of ceramic capacitor described in Japanese Utility Model Publication No. H5-61998 is partially unidentified and the other components are totally unidentified. Further, said publication does not indicate temperature range wherein said capacitor temperature characteristic is shown.

SUMMARY OF THE INVENTION

A purpose of the present invention, reflecting this situation, is to provide a dielectric ceramic composition, showing large absolute value of capacity temperature characteristic within a wide temperature range, and an electronic device, comprising a dielectric layer constituted by the dielectric ceramic composition, by using predetermined composition of a material to make the dielectric ceramic composition.

To attain the above object, the inventors engaged in intensive studies and found that dielectric ceramic composition comprising a main component expressed by a general formula: $(Ba_{1-x-y}Sr_xCa_y)_m(Ti_{1-z}Zr_z)O_3$ and predetermined subcomponents show large value of capacity temperature characteristic (−7000 to −3000 ppm/° C.), which lead to a completion of the invention.

To attain the above object, a dielectric ceramic composition of the invention comprises
a main component expressed by a general formula:

a first subcomponent comprising Mg oxide,
a second subcomponent comprising at least one kind of oxide selected from oxides of Mn and Cr,
a third subcomponent comprising R oxide (note R is selected at least one kind from Y, La Ce, Pr, Nd, Sm, Gd, Tb, Dy, Ho and Yb), and
a fourth subcomponent comprising an oxide including Si,
wherein the general formula shows $0.20 \leq x \leq 0.40$, $0 \leq y \leq 0.20$, $0 \leq z \leq 0.30$, and $0.950 \leq m \leq 1.050$, wherein ratios of the respective subcomponents with respect to 100 moles of said main component are
the first subcomponent: 0.5 to 5 moles (in terms of element),
the second subcomponent: 0.05 to 2 moles (in terms of element),
the third subcomponent: 1 to 8 moles (in terms of element),
the fourth subcomponent: 0.5 to 5 moles (in terms of an oxide or a complex oxide), and
within a temperature range of −25 to 105° C., a capacitance change rate on the basis of capacitance at 25° C., with respect to slope "a" of a line which shows capacity temperature characteristic on the basis of capacitance at 25° C., is within −15 to +5% and said slope "a" is −7000 to −3000 ppm/° C.

An electronic device according to the present invention is not particularly limited as far as it comprises a dielectric layer composed of the dielectric ceramic composition as set forth in any one of the above, and is, for example, a multilayer ceramic capacitor element comprising a capacitor element body, wherein dielectric layers and internal electrode layers are alternately stacked. In the present invention, the conductive material included in the internal electrode layer is not particularly limited and is, for example, Ni or a Ni alloys According to the present invention, by determining compositions of main component and subcomponent of dielectric ceramic composition, a dielectric ceramic composition is characterized in that, within a wide temperature range (e.g. −25 to 105° C.), a capacitance change rate on the basis of capacitance at 25° C., with respect to slope "a" of a line which shows capacity temperature characteristic on the basis of capacitance at 25° C., is within −15 to +5% and said slope "a" is −7000 to −3000 ppm/° C.

Note that a capacitance change rate can be within a predetermined range with respect to any capacity temperature characteristic.

Accordingly, by using dielectric ceramic composition of the invention as dielectric layer of electric device, such as multilayer ceramic capacitor, it is not required to revise an error of a detected value of output voltage of VR caused by variation of Rdc without using NTC thermistor, for instance. Further, as long as dielectric ceramic composition determined in the present invention is used and absolute value of capacity temperature characteristic is required to be large, its application is not particularly limited.

Reasons for capability of obtaining these dielectric ceramic compositions can be said as following.

An absolute value of capacity temperature characteristic of $SrTiO_3$ is relatively large (−3300 ppm/° C.), however, a peak of specific permittivity is shown at a considerably low temperature when compared to an ordinal temperature range (−25° C. to 105° C.). Note that said peak is shown near Curie temperature.

Therefore, by shifting this peak to a higher temperature, a great inclination part at a higher temperature than the temperature shown by the peak will be within an ordinal temperature range. In order to shift the peak to a higher temperature, it can be considered to substitute a part of SrTiO$_3$ to Ba. An element having a large ionic radius, such as Ba, has an effect to shift the peak to a higher temperature.

According to the present invention, with the method described above, the peak of specific permittivity is shifted to a higher temperature, therefore, the great inclination part at higher temperature than the temperature shown by the peak will be within an ordinal temperature range (−25° C. to 105° C.). As a result, a dielectric ceramic composition showing larger absolute value of capacity temperature characteristic within the above temperature range can be obtained.

Further, by comprising subcomponents, a great inclination, namely, a large absolute value of capacity temperature characteristic can be maintained while making capacitance change rate within a predetermined range.

BRIEF DESCRIPTION OF THE DRAWINGS

Hereinafter, the present invention will be described based on embodiments shown in drawings.

DESCRIPTION OF THE PREFERRED EMBODIMENTS

Multilayer Ceramic Capacitor 1

Figure 1:
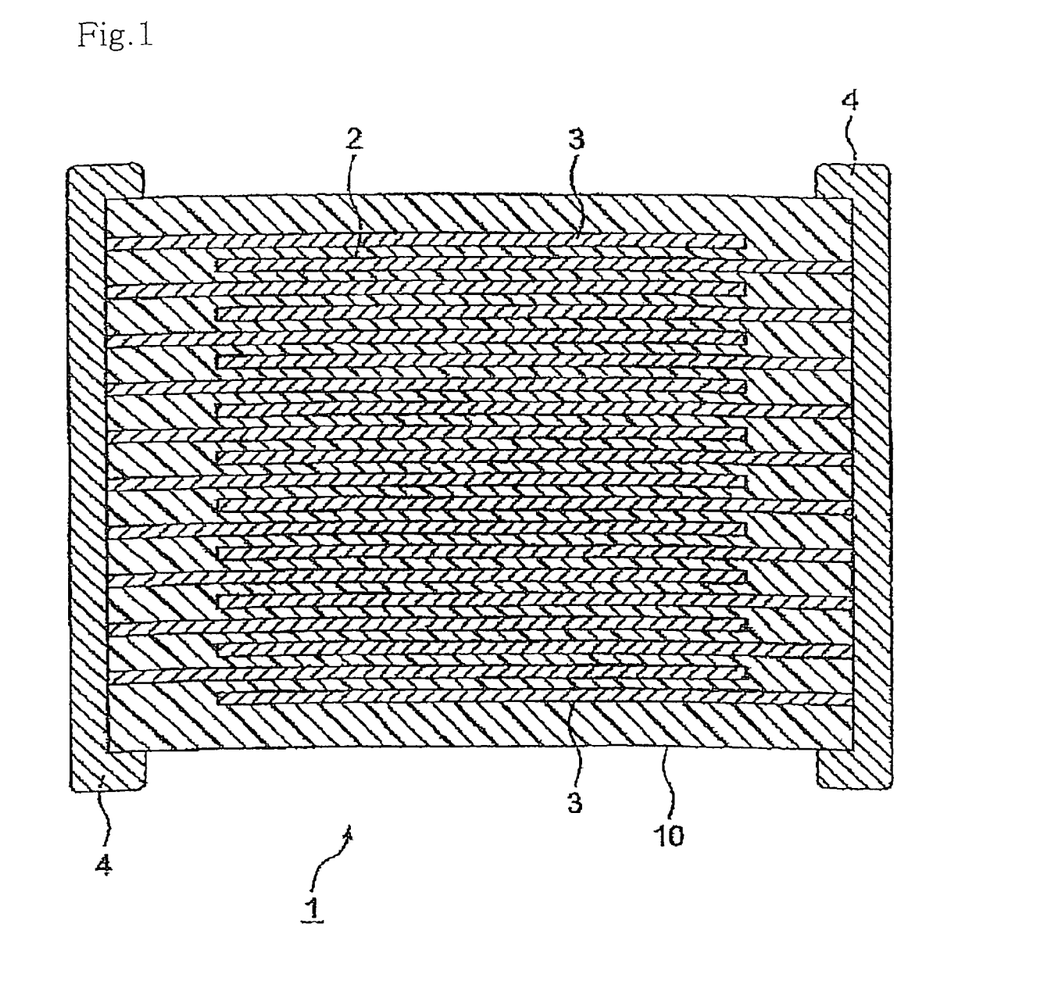
FIG. 1 is a perspective view of a multilayer ceramic capacitor according to an embodiment of the present invention.

As shown in FIG. 1, multilayer ceramic capacitor 1 according to an embodiment of the present invention comprises a capacitor element body 10, wherein dielectric layers 2 and internal electrode layers 3 are alternately stacked. On both end portions of the capacitor element body 10, a pair of external electrode 4 is formed to be connected respectively to the internal electrode layers 3 alternately arranged inside the element body 10. Formation of the capacitor element body 10 is not particularly limited and generally rectangular parallelepiped. Further, size of the capacitor element body 10 is not particularly limited and can be an appropriate size in accordance with the use object.

The internal electrode layers 3 are stacked, so that each of the end surfaces is alternately exposed to surfaces of the two facing end portions of the capacitor element body 10. The pair of external electrodes 4 are formed on both end portions of the capacitor element body 10 and connected to the exposed end surfaces of the alternately arranged internal electrode layers 3 so as to compose a capacitor circuit.

Dielectric Layer 2

Dielectric layer 2 comprises dielectric ceramic composition of the invention. Dielectric ceramic composition of the invention comprises a main component expressed by a general formula:

$(Ba_{1-x-y}Sr_xCa_y)_m(Ti_{1-z}Zr_z)O_3$, a first subcomponent comprising Mg oxide,
a second subcomponent comprising at least one kind of oxide selected from oxides of Mn and Cr,
a third subcomponent comprising R oxide (note R is selected at least one kind from Y, La Ce, Pr, Nd, Sm, Gd, Tb, Dy, Ho and Yb), and
a fourth subcomponent comprising an oxide including Si.

As mentioned above, the main component of dielectric composition is a compound comprising perovskite structure expressed by a general formula: $(Ba_{1-x-y}Sr_xCa_y)_m(Ti_{1-z}Zr_z)O_3$. Main component of the dielectric composition comprises perovskite structure wherein A site consists of Ba, Sr and Ca and B site consists of Ti and Zr.

In the above general formula, "x" indicates Sr ratio in A site, consisting of Ba, Sr and Ca, of main component. "x" is $0.20 \leq x \leq 0.40$, preferably $0.25 \leq x \leq 0.35$. When "x" is too small, dielectric loss and capacitance change rate tend to deteriorate, while when too large, specific permittivity reduces and capacitance change rate at a lower temperature tends to deteriorate.

In the above general formula, "y" indicates Ca ratio in A site. "y" is $0 \leq y \leq 0.20$, preferably $0 \leq y \leq 0.1$, more preferably y=0. When "y" is too large, capacitance change rate is flattened and tends to be without a preferable range of the invention.

In the above general formula, "z" indicates Zr ratio in B site, consisting of Ti and Zr, of main component. "z", is $0.20 \leq z \leq 0.30$, preferably $0 \leq z \leq 0.1$, more preferably z=0. When "z" is too large, specific permittivity reduces and capacitance change rate is flattened and tends to be without a preferable range of the invention.

Note that when y=0 and z=0, the above general formula is expressed by $(Ba_{1-x}Sr_x)_mTiO_3$ wherein "x" indicates a ratio of Ba and Sr and "x" is preferably within the above mentioned range.

In the above general formula, "m" indicates mole ratio of A site and B site. "m" is 0.950 to 1.050, preferably 0.98 to 1.02.

Content of the first subcomponent (Mg oxide) with respect to 100 moles of the main component is 0.5 to 5 moles, preferably 1 to 4 moles, more preferably 1.5 to 3 moles in terms of an element. When content of the first subcomponent is too small, capacitance change rate deteriorates and high temperature accelerated lifetime tends to be deteriorated, while when too large, it tends not to sinter densely.

Content of the second subcomponent (oxides of Mn and Cr) with respect to 100 moles of the main component is 0.05 to 2 moles, preferably 0.1 to 1 mole, more preferably 0.1 to 0.5 mole in terms of an element. When content of the second subcomponent is too small, insulation resistance tends to deteriorate while when too large, high temperature accelerated lifetime tends to be deteriorated.

The second subcomponent comprises at least one kind of oxide selected from oxides of Mn and Cr. Considering insulation resistance, Mn is preferable.

Content of the third subcomponent (R oxide) with respect to 100 moles of the main component is 1 to 8 moles, preferably 2 to 7 moles, more preferably 3 to 5 moles in terms of an element. When content of the third subcomponent is too small, high temperature accelerated lifetime tends to be deteriorated, while when too large, it tends not to sinter densely.

R in the third subcomponent is selected at least one kind from Y, La Ce, Pr, Nd, Sm, Gd, Tb, Dy, Ho and Yb. Considering high temperature accelerated lifetime and capacitance change rate, Tb and Y are preferable and Y is more preferable.

Content of the fourth subcomponent (oxide including Si) with respect to 100 moles of the main component is 0.5 to 5 moles, preferably 1 to 4.5 moles, more preferably 2 to 3.5 moles in terms of the oxide. When content of the fourth subcomponent is too small, capacitance change rate tends to deteriorate while when too large, it tends not to sinter densely.

The fourth subcomponent of oxide including Si may be a complex or a simple oxide, however, complex oxide is preferable and $(Ba, Ca)_n SiO_{2+n}$ (note that n=0.8 to 1.2) is more preferable. Further, "n" in $(Ba, Ca)_n SiO_{2+n}$ is preferably 0 to 2 and more preferably 0.8 to 1.2. When "n" is too small, it tends to react with barium titanate included in a main component and deteriorate dielectric characteristic, while when too large, melting point tends to be higher and degree of sintering tends to be deteriorated. Note that ratio of Ba and Ca included in the fourth subcomponent is optional and only either one may be included.

Dielectric ceramic composition of the invention is preferable to further include fifth subcomponent. Content of the fifth subcomponent with respect to 100 moles of the main component is 0 to 0.2 mole, preferably 0.01 to 0.07 mole, more preferably 0.02 to 0.06 moles in terms of each element. When content of the fifth subcomponent is too large, insulation resistance tends to be deteriorated.

The fifth subcomponent comprises at least one kind of oxide selected from oxides of V, Mo, W, Ta and Nb. Considering high temperature accelerated lifetime, it is preferably Nb and V, and more preferably V.

In the present specification, each oxide or complex oxide comprising each component are expressed by stoichiometric composition but oxidized state of each oxide or complex oxide can be out of this range. Note that the above ratio of each component, except for the fourth subcomponent, is obtained by converting metal amount included in an oxide of each component to an element. The fourth subcomponent is obtained by converting the same to oxide or complex oxide.

Note that an average particle diameter of sintered body obtained by sintering the above main component and subcomponents is preferably 0.2 to 1.5 μm, more preferably 0.2 to 0.8 μm.

Thickness of dielectric layer 2 is not particularly limited and can be an appropriate thickness in accordance with the use of multilayer ceramic capacitor 1.

Dielectric ceramic composition of the invention is characterized in that, within a temperature range of −25 to 105° C., a capacitance change rate on the basis of capacitance at 25° C., with respect to slope "a" of a line which shows capacity temperature characteristic on the basis of capacitance at 25° C., is within −15 to +5%, preferably −10 to 0%.

Said slope "a" is −7000 to −3000 ppm/° C., preferably −6000 to −4000 ppm/° C., more preferably −5500 to −4500 ppm/° C.

Figure 2A:
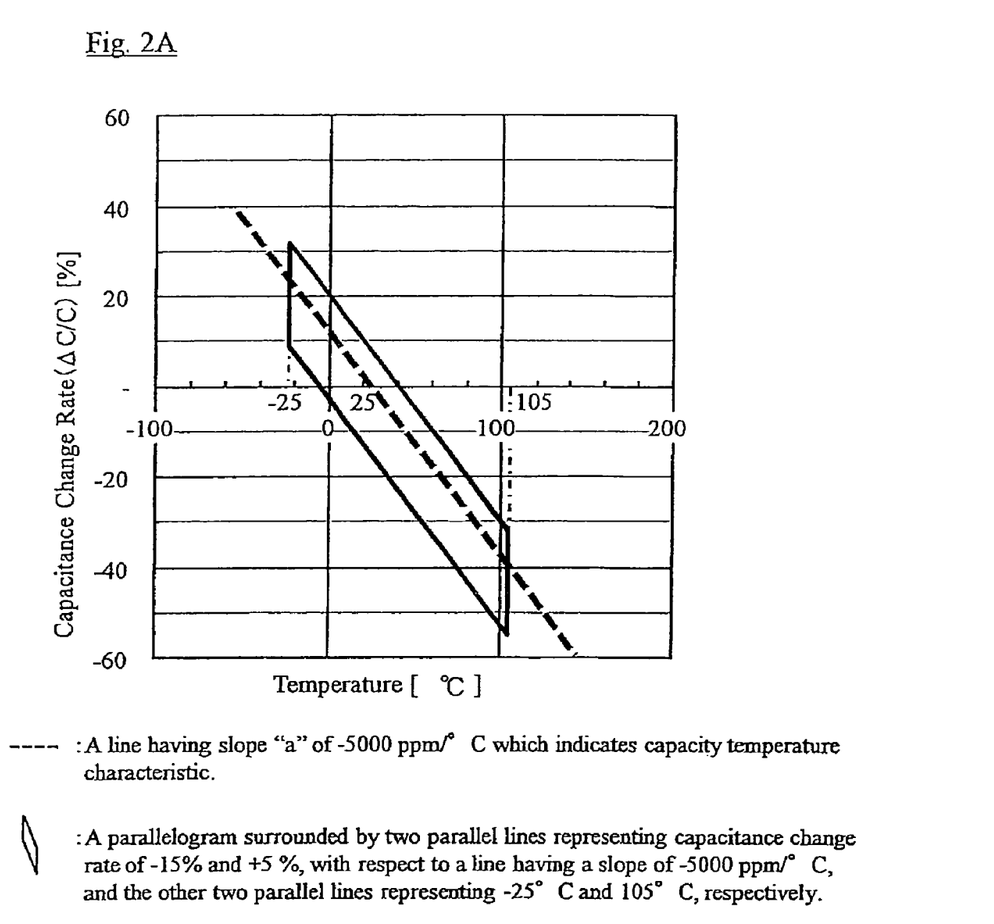
FIG. 2A is a graph showing a parallelogram surrounded by lines showing capacitance change rate of −15 and +5%, respectively, with respect to a line showing capacity temperature characteristic on the basis of capacitance at 25° C. and having a slope of −5000 ppm/° C., and also by lines showing temperatures of −25° C. and 105° C., respectively.
Figure 2B:
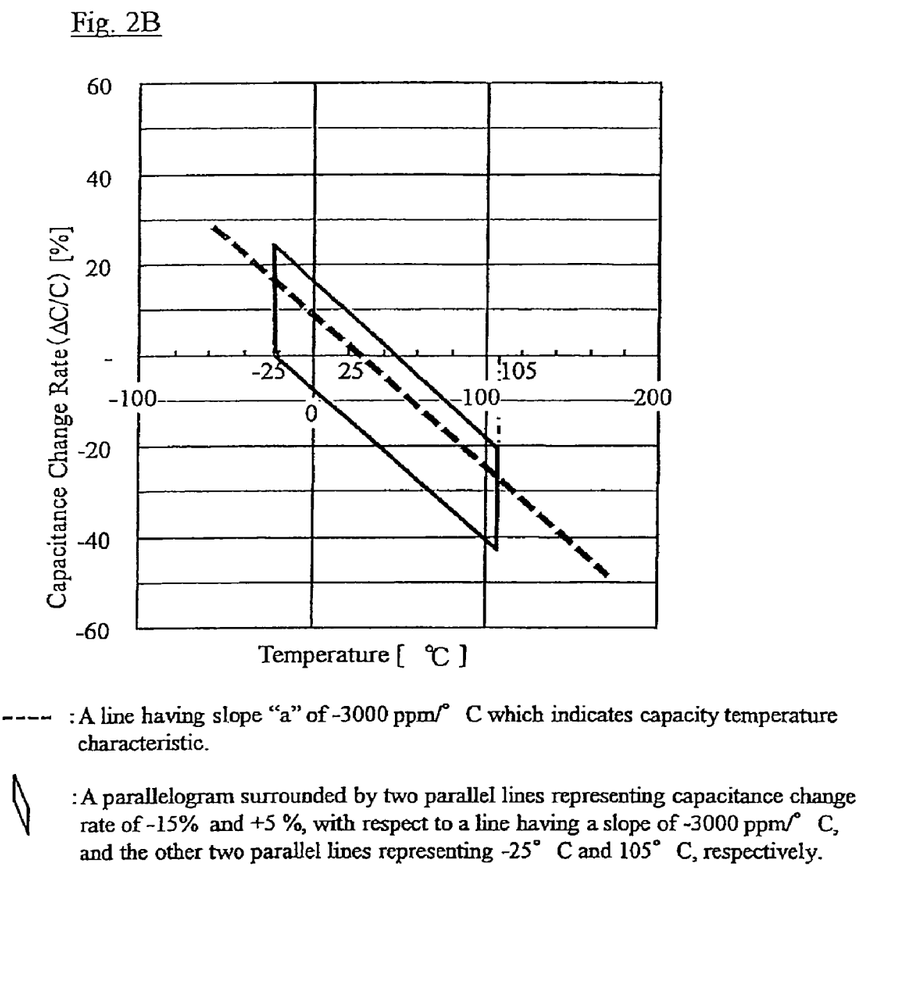
FIG. 2B is a graph showing a parallelogram surrounded by lines showing capacitance change rate of −15 and +5%, respectively, with respect to a line showing capacity temperature characteristic on the basis of capacitance at 25° C. and having a slope of −3000 ppm/° C., and also by lines showing temperatures of −25° C. and 105° C., respectively.

As shown in FIGS. 2A and 2B, "−15 to +5% with respect to slope "a" of a line which shows capacity temperature characteristic on the basis of capacitance at 25° C. at a temperature range of −25 to 105° C." determines an area surrounded by a parallelogram comprising two parallel lines representing said −15% and +5%, respectively, and the other two parallel lines representing −25° C. and 105° C., respectively, shown in a graph indicated by x-axis of temperature and y-axis of capacitance change rate. Namely, when the slope "a" is −5000 ppm/° C., said area is the parallelogram shown in FIG. 2A, while when −3000 ppm/° C., the parallelogram shown in FIG. 2B.

Internal Electrode 3

Base metal included in internal electrode 3 is not particularly limited and, since composite material of dielectric layer 2 show reduction-resistance, relatively low cost base metals can be used. As the base metal to be used as the conductive material, Ni or a Ni alloy is preferable. As the Ni alloy, an alloy of one or more kinds selected from Mn, Cr, Co and Al with Ni is preferable, and a content of Ni in the alloy is preferably 95 wt % or more. Note that the Ni or the Ni alloy may contain various trace components, such as P, by not more than 0.1 wt % or so. Further, internal electrode 3 can be made by using commercially available electrode paste. A thickness of the internal electrode layer 3 in the present embodiment can suitably determined in accordance with its use.

External Electrode 4

Conducting material included in external electrode 4 is not particularly limited and a low cost material such as Ni, Cu and their alloys can be used in the invention. A thickness of the external electrode 4 can suitably determined in accordance with its use.

Manufacturing Method of Multilayer Ceramic Capacitor 1

Multilayer ceramic capacitor 1 of the present embodiment is, as is the same with conventional multilayer ceramic capacitor, manufactured by making green chip by normal printing method or sheet method using paste, firing the same, and then, printing or transferring external electrode and firing the same. Said manufacturing method will be concretely described below.

First, dielectric material (dielectric ceramic composition powder) included in dielectric layer paste is prepared; paste the same, and then dielectric layer paste is prepared. Said dielectric layer paste can be an organic paste, wherein dielectric material and organic vehicle are kneaded, or an aqueous paste.

As dielectric material, oxides of each component mentioned above, their mixtures and complex oxides can be used. Further, a mixture suitably selected from each compound that become the above mentioned oxides or complex oxides after firing, such as carbonates, oxalates, nitrates, hydroxides and organic metal compounds can be used. Content of each compound in dielectric material is determined in order to obtain the above dielectric ceramic composition after firing.

Further, as at least a part of material in the above each component, each oxide, complex oxides, and compounds that become each oxide or complex oxides after firing can be used as they are, or as roasted powder obtained by preliminary firing the same.

An average particle diameter of material of main component $(Ba_{1-x-y}Sr_xCa_y)_m(Ti_{1-z}Zr_z)O_3$ in dielectric material is preferably 0.15 to 0.7 μm, more preferably 0.2 to 0.5 μm. When the average particle diameter of material is smaller than 0.15 μm, the average particle diameter of sintered body becomes 0.2 μm or less, that lowers its specific permittivity and tends to deteriorate capacitance change rate at higher temperature. Further, when the average particle diameter of material is larger than 0.7 μm, the average particle diameter of sintered body becomes 1.5 μm or more that deteriorates high temperature accelerated lifetime and capacitance change rate at lower temperature.

The organic vehicle is a binder dissolved in an organic solvent. The binder used for the organic vehicle is not particularly limited and may be suitably selected from ethyl cellulose, polyvinyl butyral, and other usual various types of binders. Further, the organic solvent used is also not particularly limited and may be suitably selected from terpineol, butyl carbitol, acetone, toluene, and other various types of organic solvents in accordance with the method of use, such as printing method and sheet method.

When dielectric layer paste is an aqueous paste, an aqueous vehicle, wherein water-soluble binder, dispersant, etc. are solved in water, and dielectric material are kneaded. Water-soluble binder used for the aqueous vehicle is not particularly limited and polyvinyl alcohol, cellulose, and a water-soluble acrylic resin, etc. may be used.

An internal electrode layer paste is fabricated by kneading the conductive material composed of the above variety of conductive metals and alloys, or a variety of oxides, organic metal compounds and resonates, etc. to be the above conductive materials after firing, with the above organic vehicle.

An external electrode paste is fabricated in the same way as that of the above internal electrode layer paste.

A content of the organic vehicle in each paste is not particularly limited and may be a normal content of, for example, 1 to 5 wt % or so of the binder and 10 to 50 wt % or so of the solvent. Also, additives selected from a variety of dispersants, plasticizers, dielectrics and insulators, etc. may be included in each paste in accordance with need. Total of said content is preferably 10 wt % or less.

When using the printing method, the dielectric layer paste and internal electrode layer paste are printed on a PET or other substrate, stacked, and then cut to predetermined forms which are then peeled off from the substrate to obtain green chips.

Further, when using the sheet method, the dielectric layer paste is used to form a green sheet, this is printed with the internal electrode layer paste, and then this is stacked to form a green chip.

Before firing, the green chip is treated to remove the binder. The conditions of treatment for removing the binder are; temperature raising rate of preferably 5 to 300° C./hour, holding temperature of preferably 180 to 400° C. and temperature holding time of preferably 0.5 to 24 hours. Further, firing atmosphere is air or reduced atmosphere.

Atmosphere when firing green chip can be an appropriate atmosphere in accordance with conductive material included in internal electrode layer paste, however, when using Ni or Ni alloy or other base metal as the conductive material, the oxygen partial pressure in the firing atmosphere is preferably $10^{-14}$ to $10^{-10}$ MPa. If the oxygen partial pressure is less than that range, the conductive material of the internal electrode layers will abnormally sinter and will end up causing disconnection in some. Further, if the oxygen partial pressure exceeds that range, the internal electrode layers tend to oxidize.

Further, the holding temperature at the time of firing is preferably 1000 to 1400° C. If the holding temperature is less than the range, the densification becomes insufficient, while if over that range, the internal electrode layers will abnormally sinter causing electrode disconnection, the internal electrode layer materials will diffuse resulting in deterioration of the capacity temperature characteristic, or the dielectric ceramic composition will easily be reduced.

As the other firing conditions, the rate of temperature rise is preferably 50 to 500° C./hour, the temperature holding time is preferably 0.5 to 8 hours, and the cooling rate is preferably 50 to 500° C./hour. Further, the firing atmosphere is preferably made a reducing atmosphere.

When firing in a reducing atmosphere, it is preferable that the capacitor element body is annealed. The annealing is treatment for reoxidizing the dielectric layer. This enables the IR life to be remarkably lengthened, so the reliability is improved.

The oxygen partial pressure in the annealing atmosphere is preferably $10^{-9}$ to $10^{-5}$ MPa.

The holding temperature at the time of annealing is preferably 1100° C. or less, particularly 500 to 1100° C.

As other annealing conditions, the temperature holding time is preferably 0 to 20 hours.

To wet the $N_2$ gas or a mixed gas etc. in the above treatment to remove the binder, firing, and annealing, for example a wetter etc. may be used. In this case, the water temperature is preferably 5 to 75° C. or so. The treatment to remove the binder, firing, and annealing may be performed consecutively or independently.

The thus obtained capacitor element body is end polished and fired with the external electrode paste to form the external electrodes 4. Further, in accordance with need, the external electrodes 4 are plated etc. to form covering layers.

The thus produced multilayer ceramic capacitor of the present embodiment is mounted on a printed circuit board by soldering etc. and used for various types of electronic equipments.

An embodiment of the present invention was explained above, but the present invention is not limited to the embodiment and may be variously embodied within the scope of the present invention.

For example, in the above embodiment, a multilayer ceramic capacitor was explained as an example of an electronic device according to the present invention, but the electronic device according to the present invention is not limited to a multilayer ceramic capacitor and may be any as far as it includes a dielectric layer having the above composition.

EXAMPLES

Below, the present invention will be explained based on further detailed examples; however, the present invention is not limited to the examples.

Example 1

First, a multilayer ceramic capacitor of sample 1 in Table 1 is described.

$(Ba_{1-x-y}Sr_xCa_y)_m(Ti_{1-z}Zr_z)O_3$, $MgCO_3$, MnO, $Y_2O_3$, $BaCaSiO_3$ and $V_2O_5$ having an average particle diameter of 0.351 μm were prepared, mixed by a ball mill, the obtained mixed powder was preliminary fired at 1200° C., and a preliminary fired powder having an average particle diameter of 0.4 μm was obtained. Next, the obtained preliminary fired powder was wet pulverized by a ball mill for 15 hours, and then dried to obtain dielectric material. Note that, after firing, $MgCO_3$ will be included in dielectric ceramic composition as MgO.

Composition of the main component and contents of each subcomponent are shown in sample 1 of Table 1. Contents of each subcomponent, except for the fourth subcomponent, are the contents of element with respect to 100 moles of a main component $(Ba_{1-x-y}Sr_xCa_y)_m(Ti_{1-z}Zr_z)O_3$. Content of the fourth subcomponent, with respect to 100 moles of the main component, is a content in terms of a complex oxide or each oxide. Further, in the present embodiment, $(Ba_{1-x-y}Sr_xCa_y)_m(Ti_{1-z}Zr_z)O_3$ wherein m=1.000 was used.

Next, 100 parts by weight of the obtained dielectric material, 10 parts by weight of polyvinyl butyral, 5 parts by weight of dibutyl phthalate (DBP) as plasticizer, and 100 parts by weight of alcohol as solvent were ball milled and pasted to obtain dielectric layer paste.

Next, 45 parts by weight of Ni particles, 52 parts by weight of terpineol and 3 parts by weight of ethyl cellulose were kneaded by a triple roll to be a slurry to obtain internal electrode layer paste.

By using the obtained dielectric layer paste, a green sheet having a thickness of 10 μm after drying was formed on a PET film. Next, by using the internal electrode layer paste, electrode layer was printed on the green sheet by a predetermined pattern and then, the green sheet was removed from the PET film to obtain green sheet having electrode layer. Next, a plurality of green sheets having electrode layer were stacked, bonded with a pressure to obtain green multilayer body. The green multilayer body was cut into a predetermined size to obtain green chip.

Next, the obtained green chip was subjected to binder removal processing, firing and annealing on the conditions below so as to obtain a multilayer ceramic fired body.

The binder removal processing condition was a temperature raising rate of 25° C./hour, holding temperature of 250° C., temperature holding time of 8 hours and atmosphere of air.

The firing condition was a temperature raising rate of 200° C./hour, holding temperature of 1300° C., temperature holding time of 2 hours, temperature cooling rate of 200° C./hour and atmosphere of a wet mixed gas of $N_2$ and $H_2$ (oxygen pressure of $10^{-12}$ MPa).

The annealing condition was a temperature raising rate of 200° C./hour, holding temperature of 1100° C., temperature holding time of 2 hours, temperature cooling rate of 200° C./hour and atmosphere of a wet $N_2$ gas (oxygen pressure of $10^{-7}$ MPa).

Next, after polishing an end surface of the obtained multilayer ceramic sintered body by sand blast, In—Ga was applied as external electrodes and sample of the multilayer ceramic capacitor shown in FIG. 1 was obtained. A size of the obtained capacitor sample was 3.2 mm×1.6 mm×3.2 mm, a thickness of dielectric layer was 8 μm, a thickness of internal electroe layer was 1.5 μm and the number of dielectric layers between internal electrode layers was 4.

A specific permittivity (∈s), dielectric loss (tan δ), insulation resistance (IR), capacitance change rate, high temperature accelerated lifetime (HALT) and average particle diameter in sintered body of thus obtained each capacitor sample were measured by the methods shown below.

Specific Permittivity ∈s

Specific permittivity ∈s was calculated from a capacitance of the obtained capacitor sample measured at a reference temperature of 25° C. with a digital LCR meter (4274A made by YHP) under a condition of a frequency of 1 kHz and an input signal level (measurement voltage) of 1.0 Vrms. Higher specific permittivity is preferable and those exhibited 1000 or higher were determined good in the present embodiment. The results are shown in Table 2.

Dielectric Loss (tan δ)

Dielectric loss (tan δ) was measured from the obtained capacitor sample at a reference temperature of 25° C. with a digital LCR meter (4274A made by YHP) under a condition of a frequency of 1 kHz and an input signal level (measurement voltage) of 1.0 Vrms. Lower dielectric loss is preferable and those exhibited 3% or less were determined good in the present example. The results are shown in Table 2.

Insulation Resistance (IR)

Insulation resistance (IR) was measured when a capacitor sample was impressed with DC100V for 60 seconds at 25° C. by insulation resistance meter (R8340 made by Advantest). Higher insulation resistance is preferable and those exhibited $1\times10^{10}$ MΩ or higher were determined good in the present example. The results are shown in Table 2.

Capacitance Change Rate

Capacitance was measured in a temperature range of −25 to 105° C. with a digital LCR meter (4284A made by YHP) under a condition of a frequency of 1 kHz and an input signal level (measured voltage) of 1 Vrms. Then, capacitance change rate (unit is %) was calculated at −25° C. and 105° C., with respect to the capacitance at reference temperature of 25° C. Those within −15% to +5% were determined good in the present example. The results are shown in Table 2.

High Temperature Accelerated Lifetime (HALT)

For the capacitor samples, the life time was measured while applying the direct voltage under the electric field of 40 V/μm at 200° C., and thereby the high temperature accelerated lifetime (HALT) was evaluated. In the present example, the lifetime was defined as the time from the beginning of the voltage application until the insulation resistance drops by one digit. Also, this high temperature accelerated lifetime evaluation was performed to 10 capacitor samples. In the present example, 3.1 hours or longer was determined good. The results are shown in Table 2.

Average Particle Diameter of Sintered Body

In order to measure an average particle diameter of dielectric particles in sintered body, the obtained capacitor samples were cut at a surface vertical to internal electrode, then said cut surface was polished. After chemical etching the polished surface, the surface was observed with a scanning electron microscope (SEM) and an average particle diameter was measured based on the code method by assuming that the particles have spherical shapes. The results are shown in Table 2.

Example 2

Other than determining average particle diameter of material of main component, composition of main component, contents of subcomponent with respect to 100 moles of the main component, and kinds of the third and fourth subcomponents described in tables 1 and 3, capacitor samples were fabricated in the same way as that in sample 1 and the same evaluation as that in sample 1 was made (samples 2 to 48). Results are shown in tables 2 and 4.

TABLE 1

| | | an average particle diameter of main component | compositions of main component $(Ba_{1-x-y}Sr_xCa_y)_m(Ti_{1-z}Zr_z)O_3$ | | | | contents of subcomponents with respect to 100 moles of main component [mol] | | | | | | | |
|---|---|---|---|---|---|---|---|---|---|---|---|---|---|---|
| | | | | | | | The first subcomponent (Mg) | The second subcomponent (Mn, Cr) | | The third subcomponent (rare earths) | | The fourth subcomponent kind of the fourth subcomponent | | The fifth subcomponent (V, Mo, W, Ta, Nb) |
| No. | item range | [μm] | x 0.20~0.40 | y 0~0.20 | z 0~0.30 | m 0.950~1.050 | 0.5~5 | A | 0.05~2 | R | 1~8 | | 0.5~5 | D 0~0.2 |
| 1 | | 0.35 | 0.30 | 0 | 0 | 1.000 | 2 | Mn | 0.2 | Y | 4 | BaCaSiO₃ | 3 | V 0.06 |
| 2* | | 0.35 | *0.10* | 0 | 0 | 1.000 | 2 | Mn | 0.2 | Y | 4 | BaCaSiO₃ | 3 | V 0.06 |
| 3 | | 0.35 | 0.20 | 0 | 0 | 1.000 | 2 | Mn | 0.2 | Y | 4 | BaCaSiO₃ | 3 | V 0.06 |
| 4 | | 0.35 | 0.40 | 0 | 0 | 1.000 | 2 | Mn | 0.2 | Y | 4 | BaCaSiO₃ | 3 | V 0.06 |
| 5* | | 0.35 | *0.50* | 0 | 0 | 1.000 | 2 | Mn | 0.2 | Y | 4 | BaCaSiO₃ | 3 | V 0.06 |
| 6* | | 0.35 | 0.21 | *0.30* | 0 | 1.000 | 2 | Mn | 0.2 | Y | 4 | BaCaSiO₃ | 3 | V 0.06 |
| 7 | | 0.35 | 0.24 | 0.20 | 0 | 1.000 | 2 | Mn | 0.2 | Y | 4 | BaCaSiO₃ | 3 | V 0.06 |
| 8 | | 0.35 | 0.25 | 0.15 | 0.20 | 1.000 | 2 | Mn | 0.2 | Y | 4 | BaCaSiO₃ | 3 | V 0.06 |
| 9 | | 0.35 | 0.30 | 0 | 0.30 | 1.000 | 2 | Mn | 0.2 | Y | 4 | BaCaSiO₃ | 3 | V 0.06 |
| 10* | | 0.35 | 0.30 | 0 | *0.40* | 1.000 | 2 | Mn | 0.2 | Y | 4 | BaCaSiO₃ | 3 | V 0.06 |
| 11* | | 0.35 | 0.30 | 0 | 0 | *0.900* | 2 | Mn | 0.2 | Y | 4 | BaCaSiO₃ | 3 | V 0.06 |
| 12 | | 0.35 | 0.30 | 0 | 0 | 0.950 | 2 | Mn | 0.2 | Y | 4 | BaCaSiO₃ | 3 | V 0.06 |
| 13 | | 0.35 | 0.30 | 0 | 0 | 1.050 | 2 | Mn | 0.2 | Y | 4 | BaCaSiO₃ | 3 | V 0.06 |
| 14* | | 0.35 | 0.30 | 0 | 0 | *1.100* | 2 | Mn | 0.2 | Y | 4 | BaCaSiO₃ | 3 | V 0.06 |
| 15* | | 0.35 | 0.30 | 0 | 0 | 1.000 | *0.3* | Mn | 0.2 | Y | 4 | BaCaSiO₃ | 3 | V 0.06 |
| 16 | | 0.35 | 0.30 | 0 | 0 | 1.000 | 0.5 | Mn | 0.2 | Y | 4 | BaCaSiO₃ | 3 | V 0.06 |
| 17 | | 0.35 | 0.30 | 0 | 0 | 1.000 | 5 | Mn | 0.2 | Y | 4 | BaCaSiO₃ | 3 | V 0.06 |
| 18* | | 0.35 | 0.30 | 0 | 0 | 1.000 | *8* | Mn | 0.2 | Y | 4 | BaCaSiO₃ | 3 | V 0.06 |
| 19* | | 0.35 | 0.30 | 0 | 0 | 1.000 | 2 | Mn | *0.02* | Y | 4 | BaCaSiO₃ | 3 | V 0.06 |
| 20 | | 0.35 | 0.30 | 0 | 0 | 1.000 | 2 | Mn | 0.05 | Y | 4 | BaCaSiO₃ | 3 | V 0.06 |
| 21 | | 0.35 | 0.30 | 0 | 0 | 1.000 | 2 | Mn | 2 | Y | 4 | BaCaSiO₃ | 3 | V 0.06 |
| 22* | | 0.35 | 0.30 | 0 | 0 | 1.000 | 2 | Mn | *3* | Y | 4 | BaCaSiO₃ | 3 | V 0.06 |
| 23 | | 0.35 | 0.30 | 0 | 0 | 1.000 | 2 | Cr | 0.2 | Y | 4 | BaCaSiO₃ | 3 | V 0.06 |

"*" indicates a sample without the range of the invention
"**" indicates a sample without the range of claim 3 of the invention
Italicized numerical values are without the range of the invention.

TABLE 2

| | | an average particle diameter of sintered body [μm] | initial characteristic | | | capacity temperature change rate (Tc) [%] | | high temperature accelerated life time (HALT) [n] | Decision good or bad |
|---|---|---|---|---|---|---|---|---|---|
| | | | specific permittivity (εs) | dielectric loss (tan δ) [%] | insulation resistance (R) [MΩ] | | | | |
| No. | item range | | 1000 or more | 3 or less | 1.0E10 or more | −25° C. −15%~+5% | 105° C. −15%~+5% | 3.1 or more | |
| 1 | | 0.4 | 1400 | 0.89 | 5.70E+11 | −10% | −8% | 48 | good |
| 2* | | 0.5 | 3500 | *3.20* | 1.30E+11 | *+62%* | *−20%* | 4.5 | bad |
| 3 | | 0.4 | 1800 | 1.60 | 5.00E+11 | −5% | −12% | 45 | good |
| 4 | | 0.6 | 1140 | 0.45 | 6.00E+11 | 4% | −5% | 14 | good |
| 5* | | 0.4 | *800* | 0.30 | 6.10E+11 | *+38%* | −2% | 7.2 | bad |
| 6* | | 0.6 | 1010 | 0.92 | 2.50E+11 | *−18%* | *8%* | 4.9 | bad |
| 7 | | 0.5 | 1260 | 1.19 | 4.30E+11 | −5% | −4% | 21 | good |
| 8 | | 0.4 | 1150 | 1.02 | 8.90E+11 | −12% | −2% | 28 | good |
| 9 | | 0.4 | 1110 | 0.99 | 9.50E+11 | −9% | 1% | 30 | good |
| 10* | | 0.4 | *950* | 0.67 | 3.50E+11 | *−43%* | *26%* | 38 | bad |
| 11* | | — | Do Not Sinter Densely | | | | | | bad |
| 12 | | 0.7 | 1370 | 0.81 | 6.50E+11 | −12% | −6% | 30 | good |
| 13 | | 0.4 | 1420 | 0.95 | 4.20E+11 | −8% | −10% | 25 | good |
| 14* | | — | Do Not Sinter Densely | | | | | | bad |
| 15* | | 2.3 | 2800 | 2.70 | 3.30E+10 | *+29%* | *+12%* | *0.24* | bad |
| 16 | | 0.7 | 1550 | 0.92 | 7.00E+11 | −13% | −12% | 60 | good |
| 17 | | 0.4 | 1050 | 1.30 | 4.40E+11 | −4% | 1% | 21 | good |
| 18* | | — | Do Not Sinter Densely | | | | | | bad |
| 19* | | 0.4 | 1510 | 2.30 | *8.20E+08* | −12% | −7% | 3.3 | bad |
| 20 | | 0.4 | 1400 | 1.80 | 1.20E+11 | −11% | −5% | 46 | good |
| 21 | | 0.5 | 1380 | 1.40 | 9.80E+11 | −7% | −6% | 7.6 | good |

TABLE 2-continued

| No. | item range | an average particle diameter of sintered body [μm] | initial characteristic specific permittivity (εs) 1000 or more | initial characteristic dielectric loss (tan δ) [%] 3 or less | initial characteristic insulation resistance (R) [MΩ] 1.0E10 or more | capacity temperature change rate (Tc) [%] −25° C. −15%~+5% | capacity temperature change rate (Tc) [%] 105° C. −15%~+5% | high temperature accelerated life time (HALT) [n] 3.1 or more | Decision good or bad |
|---|---|---|---|---|---|---|---|---|---|
| 22* | | 0.6 | 1320 | 1.20 | 5.20E+11 | −6% | −6% | *0.12* | bad |
| 23 | | 0.4 | 1390 | 0.91 | 6.20E+11 | −11% | −7% | 18 | good |

"*" indicates a sample without the range of the invention
"**" indicates a sample without the range of claim 3 of the invention
Italicized numerical values are without the range of the invention.

TABLE 3

| No. | item range | an average particle diameter of main component [μm] | compositions of main component $(Ba_{1-x-y}Sr_xCa_y)_m(Ti_{1-z}Zr_z)O_3$ x 0.20~0.40 | y 0~0.20 | z 0~0.30 | m 0.950~1.050 | The first sub-component (Mg) 0.5~5 | The second subcomponent (Mn, Cr) A | (Mn, Cr) 0.05~2 | The third subcomponent (rare earths) R | 1~8 | The fourth subcomponent kind of the fourth sub-component | 0.5~5 | The fifth subcomponent (V, Mo, W, Ta, Nb) D | 0~0.2 |
|---|---|---|---|---|---|---|---|---|---|---|---|---|---|---|---|
| 24* | | 0.35 | 0.30 | 0 | 0 | 1.000 | 2 | Mn | 0.2 | Y | *0.2* | BaCaSiO₃ | 3 | V | 0.06 |
| 25 | | 0.35 | 0.30 | 0 | 0 | 1.000 | 2 | Mn | 0.2 | Y | 1 | BaCaSiO₃ | 3 | V | 0.06 |
| 26 | | 0.35 | 0.30 | 0 | 0 | 1.000 | 2 | Mn | 0.2 | Y | 8 | BaCaSiO₃ | 3 | V | 0.06 |
| 27* | | 0.35 | 0.30 | 0 | 0 | 1.000 | 2 | Mn | 0.2 | Y | *12* | BaCaSiO₃ | 3 | V | 0.06 |
| 28 | | 0.35 | 0.30 | 0 | 0 | 1.000 | 2 | Mn | 0.2 | La | 4 | BaCaSiO₃ | 3 | V | 0.06 |
| 29 | | 0.35 | 0.30 | 0 | 0 | 1.000 | 2 | Mn | 0.2 | Ce | 4 | BaCaSiO₃ | 3 | V | 0.06 |
| 30 | | 0.35 | 0.30 | 0 | 0 | 1.000 | 2 | Mn | 0.2 | Pr | 4 | BaCaSiO₃ | 3 | V | 0.06 |
| 31 | | 0.35 | 0.30 | 0 | 0 | 1.000 | 2 | Mn | 0.2 | Nd | 4 | BaCaSiO₃ | 3 | V | 0.06 |
| 32 | | 0.35 | 0.30 | 0 | 0 | 1.000 | 2 | Mn | 0.2 | Sm | 4 | BaCaSiO₃ | 3 | V | 0.06 |
| 33 | | 0.35 | 0.30 | 0 | 0 | 1.000 | 2 | Mn | 0.2 | Gd | 4 | BaCaSiO₃ | 3 | V | 0.06 |
| 34 | | 0.35 | 0.30 | 0 | 0 | 1.000 | 2 | Mn | 0.2 | Tb | 4 | BaCaSiO₃ | 3 | V | 0.06 |
| 35 | | 0.35 | 0.30 | 0 | 0 | 1.000 | 2 | Mn | 0.2 | Dy | 4 | BaCaSiO₃ | 3 | V | 0.06 |
| 36 | | 0.35 | 0.30 | 0 | 0 | 1.000 | 2 | Mn | 0.2 | Ho | 4 | BaCaSiO₃ | 3 | V | 0.06 |
| 37 | | 0.35 | 0.30 | 0 | 0 | 1.000 | 2 | Mn | 0.2 | Yb | 4 | BaCaSiO₃ | 3 | V | 0.06 |
| 38* | | 0.35 | 0.30 | 0 | 0 | 1.000 | 2 | Mn | 0.2 | Y | 4 | BaCaSiO₃ | *0.2* | V | 0.06 |
| 39 | | 0.35 | 0.30 | 0 | 0 | 1.000 | 2 | Mn | 0.2 | Y | 4 | BaCaSiO₃ | 0.5 | V | 0.06 |
| 40 | | 0.35 | 0.30 | 0 | 0 | 1.000 | 2 | Mn | 0.2 | Y | 4 | BaCaSiO₃ | 5 | V | 0.06 |
| 41* | | 0.35 | 0.30 | 0 | 0 | 1.000 | 2 | Mn | 0.2 | Y | 4 | BaCaSiO₃ | *8* | V | 0.06 |
| 42 | | 0.35 | 0.30 | 0 | 0 | 1.000 | 2 | Mn | 0.2 | Y | 4 | BaSiO₃ | 3 | V | 0.06 |
| 43 | | 0.35 | 0.30 | 0 | 0 | 1.000 | 2 | Mn | 0.2 | Y | 4 | CaSiO₃ | 3 | V | 0.06 |
| 44 | | 0.35 | 0.30 | 0 | 0 | 1.000 | 2 | Mn | 0.2 | Y | 4 | SiO₃ | 3 | V | 0.06 |
| 45 | | 0.35 | 0.30 | 0 | 0 | 1.000 | 2 | Mn | 0.2 | Y | 4 | BaCaSiO₃ | 3 | V | 0 |
| 46 | | 0.35 | 0.30 | 0 | 0 | 1.000 | 2 | Mn | 0.2 | Y | 4 | BaCaSiO₃ | 3 | V | 0.2 |
| 47** | | 0.35 | 0.30 | 0 | 0 | 1.000 | 2 | Mn | 0.2 | Y | 4 | BaCaSiO₃ | 3 | V | *0.3* |
| 48 | | 0.35 | 0.30 | 0 | 0 | 1.000 | 2 | Mn | 0.2 | Y | 4 | BaCaSiO₃ | 3 | Mo | 0.06 |
| 49 | | 0.35 | 0.30 | 0 | 0 | 1.000 | 2 | Mn | 0.2 | Y | 4 | BaCaSiO₃ | 3 | W | 0.06 |
| 50 | | 0.35 | 0.30 | 0 | 0 | 1.000 | 2 | Mn | 0.2 | Y | 4 | BaCaSiO₃ | 3 | Ta | 0.06 |
| 51 | | 0.35 | 0.30 | 0 | 0 | 1.000 | 2 | Mn | 0.2 | Y | 4 | BaCaSiO₃ | 3 | Nb | 0.06 |
| 52 | | 0.15 | 0.30 | 0 | 0 | 1.000 | 2 | Mn | 0.2 | Y | 4 | BaCaSiO₃ | 3 | V | 0.06 |
| 53 | | 0.7 | 0.30 | 0 | 0 | 1.000 | 2 | Mn | 0.2 | Y | 4 | BaCaSiO₃ | 3 | V | 0.06 |

"*" indicates a sample without the range of the invention
"**" indicates a sample without the range of claim 3 of the invention
Italicized numerical values are without the range of the invention.

TABLE 4

| No. | item range | an average particle diameter of sintered body [μm] | initial characteristic | | | capacity temperature change rate (Tc) [%] | | high temperature accelerated life time (HALT) [n] | Decision |
| --- | --- | --- | --- | --- | --- | --- | --- | --- | --- |
| | | | specific permittivity (εs) | dielectric loss (tan δ) [%] | insulation resistance (R) [MΩ] | −25° C. | 105° C. | | |
| | | | 1000 or more | 3 or less | 1.0E10 or more | −15%~+5% | −15%~+5% | 3.1 or more | good or bad |
| 24* | | 0.8 | 1480 | 0.92 | 5.50E+11 | −14% | −12% | *0.21* | bad |
| 25 | | 0.4 | 1510 | 0.75 | 6.70E+11 | −12% | −1% | 18 | good |
| 26 | | 0.4 | 1240 | 1.90 | 9.60E+10 | −5% | −2% | 44 | good |
| 27* | | — | Do Not Sinter Densely | | | | | | bad |
| 28 | | 1.1 | 1950 | 1.30 | 2.30E+10 | −14% | 4% | 4.5 | good |
| 29 | | 0.8 | 1840 | 1.24 | 4.50E+10 | −13% | 2% | 8.9 | good |
| 30 | | 0.7 | 1600 | 1.14 | 7.80E+10 | −13% | 1% | 19 | good |
| 31 | | 0.6 | 1590 | 1.10 | 9.80E+10 | −12% | −5% | 25 | good |
| 32 | | 0.6 | 1540 | 1.02 | 1.10E+11 | −12% | −9% | 36 | good |
| 33 | | 0.4 | 1400 | 0.92 | 1.10E+11 | −12% | −14% | 46 | good |
| 34 | | 0.4 | 1400 | 0.75 | 6.10E+11 | −11% | −13% | 52 | good |
| 35 | | 0.4 | 1400 | 0.95 | 4.80E+11 | −10% | −10% | 32 | good |
| 36 | | 0.4 | 1400 | 0.98 | 4.80E+11 | −10% | −11% | 28 | good |
| 37 | | 0.35 | 1380 | 1.03 | 3.40E+11 | −9% | −1% | 9.2 | good |
| 38* | | 0.9 | 2050 | 1.90 | 2.00E+11 | *+22%* | +6% | 4.1 | bad |
| 39 | | 0.4 | 1550 | 0.91 | 1.20E+11 | −8% | −12% | 20 | good |
| 40 | | 0.4 | 1210 | 1.10 | 8.10E+10 | −7% | −6% | 16 | good |
| 41* | | — | Do Not Sinter Densely | | | | | | bad |
| 42 | | 0.4 | 1450 | 1.32 | 4.30E+11 | −11% | −13% | 12 | good |
| 43 | | 0.4 | 1390 | 0.77 | 9.20E+10 | −10% | −9% | 18 | good |
| 44 | | 0.5 | 1410 | 0.49 | 8.90E+11 | −14% | −14% | 32 | good |
| 45 | | 0.5 | 1400 | 0.79 | 9.50E+11 | −9% | −8% | 11 | good |
| 46 | | 0.4 | 1400 | 0.84 | 2.30E+10 | −10% | −7% | 72 | good |
| 47** | | 0.4 | 1370 | 0.94 | *4.70E+09* | −11% | −8% | 88 | bad |
| 48 | | 0.3 | 1280 | 0.77 | 8.40E+10 | −10% | −9% | 24 | good |
| 49 | | 0.3 | 1290 | 0.81 | 9.10E+10 | −9% | −10% | 22 | good |
| 50 | | 0.4 | 1380 | 0.92 | 4.20E+11 | −12% | −7% | 29 | good |
| 51 | | 0.4 | 1410 | 0.89 | 4.80E+11 | −11% | −8% | 39 | good |
| 52 | | 0.2 | 1200 | 0.75 | 6.20E+11 | −8% | −3% | 84 | good |
| 53 | | 1.5 | 1500 | 1.10 | 5.20E+11 | −14% | −10% | 10 | good |

"*" indicates a sample without the range of the invention
"**" indicates a sample without the range of claim 3 of the invention
Italicized numerical values are without the range of the invention.

x (ratio of Sr in A Site) Effect (Samples 1 to 5)

As is shown in tables 1 and 2, contents of not only x but y, z, m and contents of subcomponents with respect to main component in samples 1, 3 and 4 were within the range of the present invention. These samples 1, 3 and 4 show preferable values of dielectric loss and capacitance change rate, respectively, when compared to a sample (e.g. sample 2) comprising less contents of x than the range of the present invention. Further, samples 1, 3 and 4 show preferable values of specific permittivity and capacitance change rate at a low temperature, respectively, when compared to a sample (e.g. sample 5) comprising more contents of x than the range of the present invention.

y (Ratio of Ca in A Site) Effect (Samples 1 and 6 to 8)

As is shown in tables 1 and 2, contents of not only y but x, z, m and contents of subcomponents with respect to main component in samples 1, 7 and 8 were within the range of the present invention. These samples 1, 7 and 8 show preferable values of specific permittivity and capacitance change rate, respectively, when compared to a sample (e.g. sample 6) comprising more contents of y than the range of the present invention.

z (Ratio of Zr in B Site) Effect (Samples 1 and 8 to 10)

As is shown in tables 1 and 2, contents of not only z but x, y, m and contents of subcomponents with respect to main component in samples 1, 8 and 9 were within the range of the present invention. These samples 1, 8 and 9 show preferable values of specific permittivity and capacitance change rate, respectively, when compared to a sample (e.g. sample 10) comprising more contents of z than the range of the present invention.

m (Ratio of A site and B Site) Effect (Samples 1 and 11 to 14)

As is shown in tables 1 and 2, not only m but contents of subcomponents with respect to main component in samples 1, 12 and 13 were within the range of the present invention. These samples 1, 12 and 13 show denser sintering when compared to a sample (e.g. samples 11 and 14) wherein "m" is without the range of the invention.

The First Subcomponent Effect (Samples 1 and 15 to 18)

As is shown in tables 1 and 2, contents of not only the first subcomponent (MgO) with respect to 100 moles of the main component but composition of main component and the other subcomponents in samples 1, 16 and 17 are within the range of the invention. These samples 1, 16 and 17 show preferable values of capacitance change rate and high temperature accelerated lifetime, respectively, when compared to a sample (e.g. sample 15) comprising less MgO content than the range of the present invention. Further, samples 1, 16 and 17 show denser sintering when compared to a sample (e.g. sample 18) comprising more contents of the first subcomponent than the range of the present invention.

The Second Subcomponent Effect (Samples 1 and 19 to 23)

As is shown in tables 1 and 2, a content of not only the second subcomponent (MnO) with respect to 100 moles of the main component but composition of main component and the other subcomponents in samples 1, 20 and 21 are within the range of the invention. These samples 1, 20 and 21 show preferable values of insulation resistance, when compared to a sample (e.g. sample 19) comprising less content of the second subcomponent than the range of the present invention. Further, samples 1, 20 and 21 show preferable temperature accelerated lifetime, when compared to a sample (e.g. sample 22) comprising more contents of the second subcomponent than the range of the present invention.

Also, by referring to sample 23, when Cr was used instead of Mn as the second subcomponent, it was observed that the same effects as that of Mn can be obtained.

The Third Subcomponent (R Oxide) Effect (Samples 1 and 24 to 37)

As is shown in tables 3 and 4, not only a content of the third subcomponent ($Y_2O_3$) with respect to 100 moles of the main component but composition of the main component and contents of the other subcomponents in samples 1, 25 and 26 are within the range of the invention. These samples 1, 25 and 26 show preferable value of high temperature accelerated lifetime, when compared to a sample (e.g. sample 24) comprising less content of the third subcomponent than the range of the present invention. Further, samples 1, 25 and 26 show denser sintering when compared to a sample (e.g. sample 18) comprising more content of the second subcomponent than the range of the present invention.

Also, by referring to samples 28 to 37, when La Ce, Pr, Nd, Sm, Gd, Tb, Dy, Ho and Yb were used instead of Y as R, it can be observed that the same effects as that of Y can be obtained.

The Fourth Subcomponent (Oxide Including Si) Effect (Samples 1 and 38 to 44)

As is shown in tables 3 and 4, contents of not only the fourth subcomponent ($BaCaSiO_3$) with respect to 100 moles of the main component but composition of the main component and contents of the other subcomponents in samples 1, 39 and 40 are within the range of the invention. These samples 1, 39 and 40 show preferable value of capacitance change rate, when compared to a sample (e.g. sample 38) comprising less content of the fourth subcomponent than the range of the present invention. Further, samples 1, 39 and 40 show denser sintering when compared to a sample (e.g. sample 41) comprising more contents of the fourth subcomponent than the range of the present invention.

Also, by referring to samples 42 to 44, when $BaSiO_3$, $CaSiO_3$, $SiO_2$ were used instead of $BaCaSiO_3$ as the fourth subcomponent, it was observed that the same effects as that of $BaCaSiO_3$ can be obtained.

The Fifth Subcomponent Effect (Samples 1 and 45 to 51)

As is shown in tables 3 and 4, contents of the fifth subcomponent ($V_2O_5$) with respect to 100 moles of the main component, composition of the main component and contents of the other subcomponents in samples 1, 45 and 46 are within the range of the invention. These samples 1, 45 and 46 show denser sintering when compared to a sample (e.g. sample 47) comprising more contents of $V_2O_5$ than the range of the present invention.

Further, by referring to samples 48 to 51, when Mo, W, Ta and Nb were used instead of V as the fifth subcomponent, it was observed that the same effects as that of V can be obtained.

Figure 3:
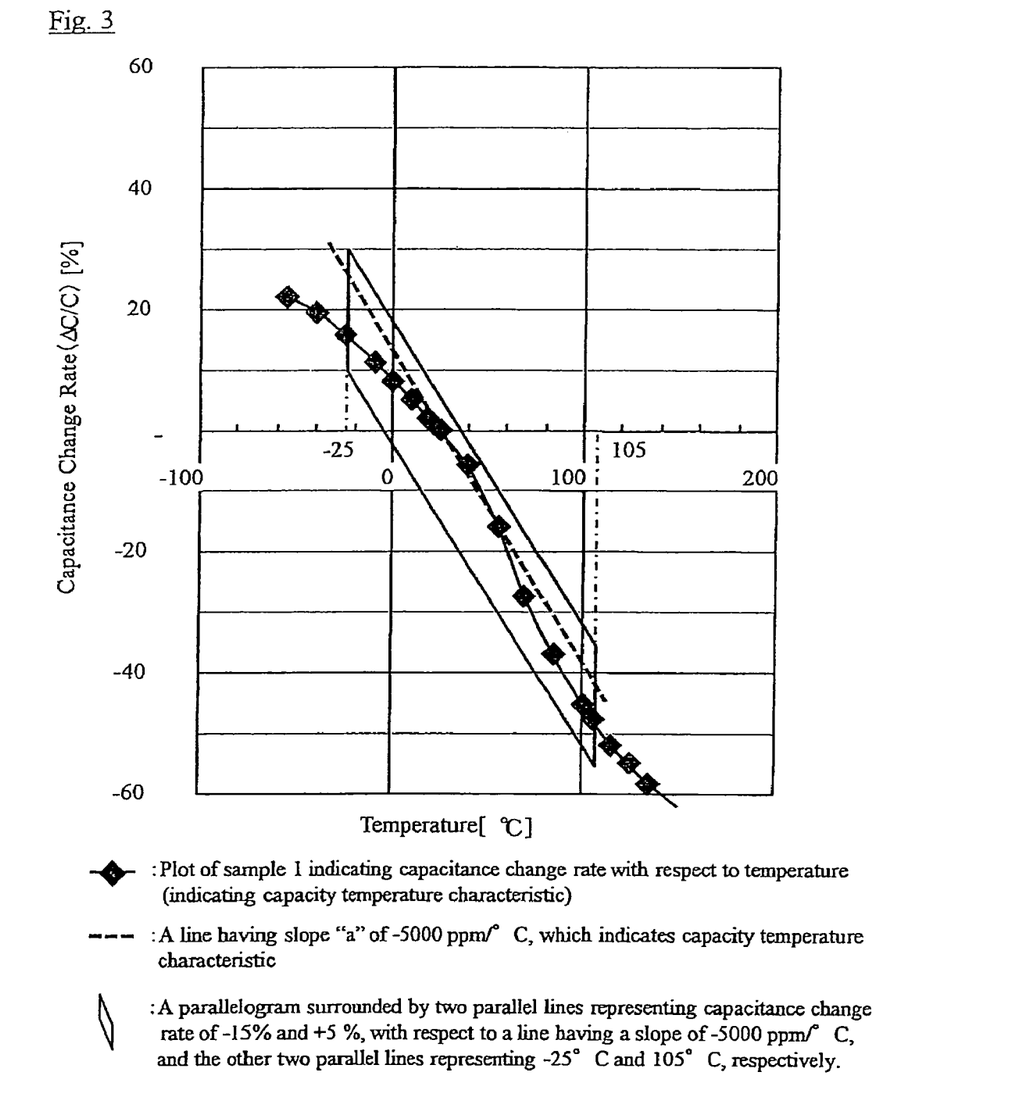
FIG. 3 is a graph showing capacity temperature characteristic on the basis of capacitance at 25° C. of sample 1 of the present example.

FIG. 3 of the invention shows capacity temperature characteristic on the basis of capacitance at 25° C. of sample 1, an example of the present invention.

Accordingly sample 1 was found that, within a temperature range of −25 to 105° C., a capacitance change rate on the basis of capacitance at 25° C., with respect to a line which shows capacity temperature characteristic on the basis of capacitance at 25° C. and has a slope of −5000 ppm/° C., is within −15 to +5%.

What is claimed is:

1. A dielectric ceramic composition comprising:
a main component expressed by a general formula:

$$(Ba_{1-x-y}Sr_xCa_y)_m(Ti_{1-z}Zr_z)O_3,$$

a first subcomponent comprising Mg oxide,
a second subcomponent comprising at least one oxide selected from oxides of Mn and Cr,
a third subcomponent comprising R oxide, wherein R is selected from at least one of Y, La Ce, Pr, Nd, Sm, Gd, Tb, Dy, Ho, and Yb, and
a fourth subcomponent comprising an oxide including Si, wherein the general formula shows $$0.20 \leq x \leq 0.40,$$

$$0 \leq y \leq 0.20,$$

$$0 \leq z \leq 0.30, \text{ and}$$

$$0.950 \leq m \leq 1.050,$$

wherein ratios of the respective subcomponents with respect to 100 moles of said main component are
the first subcomponent: 0.5 to 5 moles (in terms of element),
the second subcomponent: 0.05 to 2 moles (in terms of element),
the third subcomponent: 1 to 8 moles (in terms of element),
the fourth subcomponent: 0.5 to 5 moles (in terms of an oxide or a complex oxide), and
within a temperature range of −25 to 105° C., a capacitance change rate on the basis of capacitance at 25° C., with respect to slope "a" of a line which shows capacity temperature characteristic on the basis of capacitance at 25° C., is within −15 to +5%, and said slope "a" is −7000 to −3000 ppm/° C.

2. The dielectric ceramic composition as set forth in claim 1,
wherein y and z in the general formula of the main component are 0.

3. The dielectric ceramic composition as set forth in claim 1 further comprising:
a fifth subcomponent comprising at least one oxide selected from oxides of V, Mo, W, Ta, and Nb,
wherein a ratio of the fifth subcomponent with respect to 100 moles of said main component is 0 to 0.2 moles in terms of each element.

4. The dielectric ceramic composition as set forth in claim 2 further comprising:
a fifth subcomponent comprising at least one oxide selected from oxides of V, Mo, W, Ta, and Nb,
wherein a ratio of the fifth subcomponent with respect to 100 moles of said main component is 0 to 0.2 moles in terms of each element.

5. An electronic device comprising dielectric layers composed of the dielectric ceramic composition as set forth in claim 1.

6. An electronic device comprising dielectric layers composed of the dielectric ceramic composition as set forth in claim 2.

7. An electronic device comprising dielectric layers composed of the dielectric ceramic composition as set forth in claim 3.

8. An electronic device comprising dielectric layers composed of the dielectric ceramic composition as set forth in claim 4.

* * * * *